No. 887,474. PATENTED MAY 12, 1908.
G. J. GOUKER.
MARKER FOR CORN PLANTERS.
APPLICATION FILED JUNE 3, 1907.
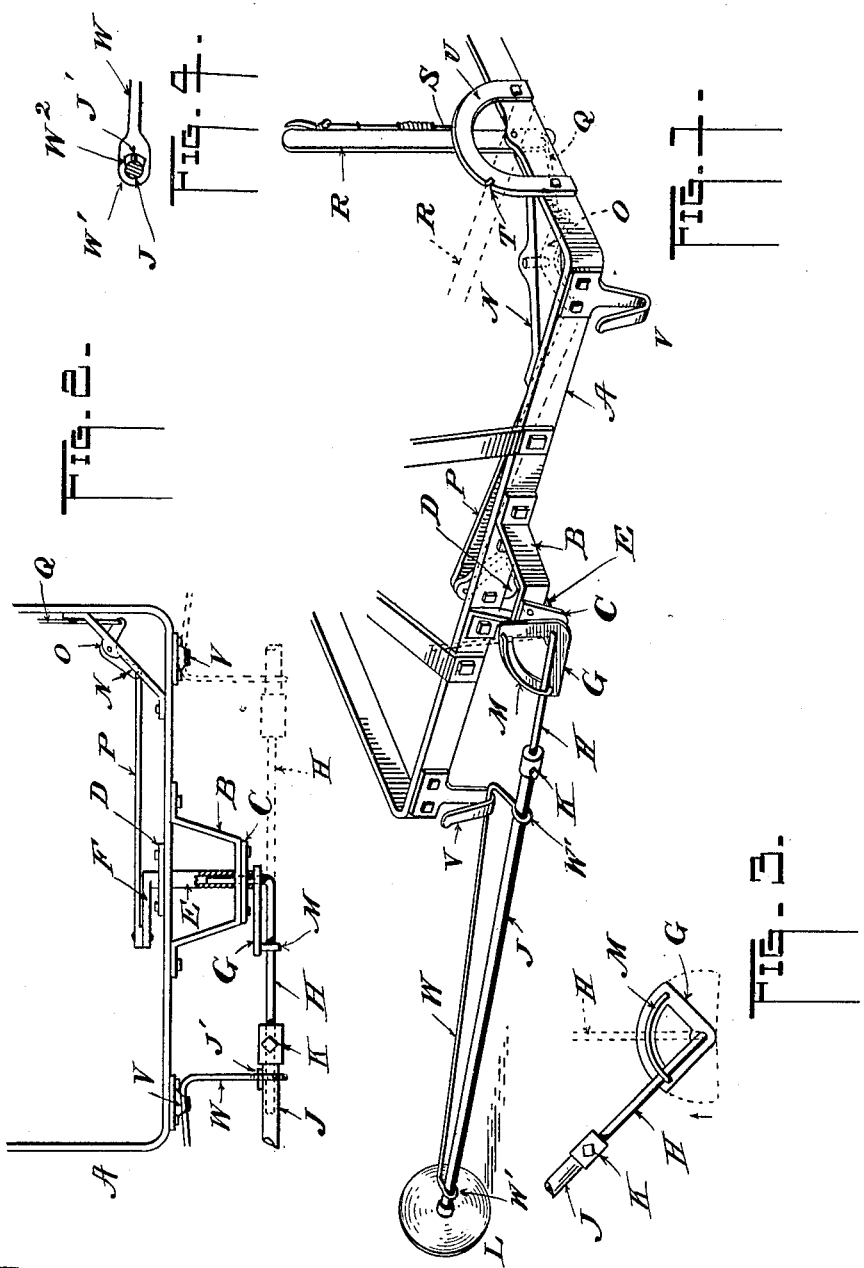
Witnesses:
Inventor
George J. Gouker,
By T. M. Thurlow,
Atty.

UNITED STATES PATENT OFFICE.

GEORGE J. GOUKER, OF PEORIA, ILLINOIS.

MARKER FOR CORN-PLANTERS.

No. 887,474.     Specification of Letters Patent.     Patented May 12, 1908.

Application filed June 3, 1907. Serial No. 376,892.

*To all whom it may concern:*

Be it known that I, GEORGE J. GOUKER, citizen of the United States residing at Peoria, in the county of Peoria and State of Illinois, have invented certain new and useful Improvements in Markers for Corn-Planters; and I do hereby declare that the following is a full, clear, and exact description of the invention, which will enable others skilled in the art to which it appertains to make and use the same.

This invention relates to a marker attachment for corn planters.

The object of the invention is to provide a marker for a corn planter that can be thrown from side to side without the necessity of the operator getting off the machine.

Another object is to provide a marker which can be readily changed from side to side of the planter while the operator occupies his seat upon the machine.

A further object is to provide a marker for a planter and a lever for casting it from side to side and for sustaining it in an inoperative position when the planter is being moved from place to place.

Another object is to provide a marker that will have no parts in the way to interfere with the operator in the manipulation of the planter or that will be in the way in getting on and off the machine.

In the present invention I pivotally attach a marker-arm at the middle of the machine in the rear thereof and extending substantially at right angles to the line of advance and connect a lever mechanism therewith by means of which it can be thrown from side to side of the planter. I further provide a drag bar or brace which is automatically thrown into engagement with a part of the machine each time the marker is reversed in position so that such marker is substantially braced and firmly held when meeting obstructions, all of which will be pointed out herein.

In the drawing herewith presented Figure 1 is a perspective view of the invention as applied to the rear end of a planter frame. Fig. 2 is a top view of the same. Fig. 3 is a rear view of a portion of the marker arm thrown up at an angle where it is carried during transportation of the machine. Fig. 4 is a detail view of certain portions of the device.

A indicates the planter frame of the ordinary type to the rear portion of which is secured in any good manner a stirrup or bracket B. Depending from said stirrup is a member C to constitute a bearing or support, while on the inside of and depending from the said frame in line with said member C is a similar bearing member D. Extending through both these said members C and D is a tubular shaft E on the inner end of which is a crank-arm F. The outer end of said shaft carries a quadrant G and the arm and said quadrant are relatively fixed in position on said shaft.

At H is a rod having one end bent at a right angle, as shown in Fig. 2, and inserted into the end of the tubular shaft E through the face of the quadrant. The other end of the rod H is inserted in the end of a hollow rod J such, for instance, as a piece of gas pipe which will be light and strong, the latter and the said rod H having slidable relation, there being a set screw at K by which to hold them relatively rigid in any adjustment. The outer end of the member J is provided with a marking device, such, for instance, as a rolling wheel or colter L which, however, may be replaced by a rigid drag member, if desired.

Secured in the quadrant and forming a guide for and inclosing the rod H and holding it in its place in the shaft E is a bail M its ends being secured in the quadrant substantially in the position shown. Suitably pivoted upon the planter frame or upon a brace thereof as shown at N is a bell-crank lever O having one of its extremities connected to the free end of the arm F hereinbefore described through a connecting rod P, its other end having connection through a link Q with the lower end of a hand lever R fulcrumed upon the planter frame in any desired manner. As shown in Fig. 1 the said lever is provided with a spring latch S adapted for engaging a notch T in a quadrant U secured on the planter frame the purpose of which will be presently shown. Attached to and depending from the planter frame at each rear corner is a hook V. On the marker rod J is mounted a draw-bar or brace W by means of a loop W' at each of its ends which inclose the said rod J one of such loops being near the marker wheel L, and the opposite end in the vicinity of the screw K. The draw bar thus arranged rests in one or the other of the hooks V just mentioned, and serves to drag the marker along behind the planter. In order that there shall be nothing to prevent the wheel L having free vertical movement so as to follow the uneven surface of the ground, and at the same time that the draw bar shall be held in position to readily engage the said hooks, I have provided for the member J a key or fixed part J' as shown in Fig. 4 at the position of one of the looped ends of the drag-bar; the loop having an elongated slot at W² to receive said key. By this means the drag-bar is permitted to rise and fall while the slot W² permits the key to play therein, the drag-bar rocking within the hook V. The key prevents the drag-bar having a too wide range of movement so that there will be no chance of its failing to drop into engagement with the said hooks V.

In operation the lever occupies the position shown in Fig. 1 while the marker is in the position indicated in that figure. When it is desired to reverse the position of the said marker, i. e., to place it at the opposite side of the machine, the lever is pushed rearward thereby shifting the bell-crank lever O upon its pivot and pulling the rod P in the direction of its length which serves to rock the shaft E in its bearings to raise the quadrant G in the manner indicated in Fig. 3. The bail M of the quadrant raises the arm J carrying it up to and a little past the vertical position. The force of gravity then acts upon said arm to carry it over to the opposite position upon the ground. The extremities of the bail M where they are secured in the quadrant G act as stops for the movement of the arm H, and I shall refer to them as stops in the claims.

The rod H of the marker being loose in the shaft E is free to turn therein and as the marker is carried over the center, as described, it falls upon the ground the opposite end of the bail from that which had lifted the marker having been carried down to a position where the rod will not strike it. The quadrant moves the rod J through 90 degrees of travel and the force of gravity completes the necessary movement of substantially 180 degrees between the extreme positions of the marker. This movement by gravity is used in the form of construction herein described since the bell-crank O and the crank-arm F can move but a limited distance, that is to say, they cannot swing a distance sufficient to positively carry the marker from one extreme position to the other, but it would be possible to readily construct mechanism that would provide for such movement if desired and eliminate the gravity idea since it is not my intention to be confined to the form herein shown and described in any way. The draw-bar or brace W during this action is lifted from its hook V but immediately engages the opposite one. To again reverse the position of the member the lever is moved in the proper direction and the same operation of the device takes place.

When transporting the machine from place to place the lever R is moved to the position shown in Fig. 1 in broken lines where its latch S engages the notch T of the quadrant. This movement raises the marker arm J at an angle of substantially 45 degrees as shown in Fig. 3, where it remains, resting upon the end of the bail M. It is readily seen that the movement of the lever which is within easy reach of the driver's seat is all that is necessary to change the position of the marker or place and hold it in a position for transportation. Equivalent means could be used for raising and carrying the marker, I having shown but one way of doing so. When the marker is in use in position upon the ground that part of the bail lying beneath the arm J is preferably positioned lower than the said arm so that it will not interfere with its free movement. I employ the drag-bar or brace W which prevents strain upon the marker arm so that there can be no disarrangement of the mechanism as might result if said drag bar were not used. I do not, therefore, depend on the strength of the parts as ordinarily used to withstand the strains imposed thereon due to obstructions.

Having thus described my invention, I claim;

In a marking device for corn planters, the combination with the planter frame, of a hollow shaft journaled thereon parallel to the line of advance, manually operated means for rocking the same, a member secured to said shaft to rock in a vertical plane and in a plane at right angles to the line of said advance, a stop secured in said member, a second stop also secured therein and separated from the first a distance of substantially 90°, a rod member having a right angled extension extending through the first described member and lying within the hollow shaft and adapted to rock within and relative to said member and said shaft in the same plane with the said member and limited in its rocking movement by the stops, a marker-carrying rod longitudinally adjustable upon the said rod member, means for adjustably securing it upon the latter, a bail loosely mounted upon the said marker-carrying member to rock thereon, means on the latter for limiting the movement of the said bail, and a hook at each side of the planter frame for engaging the bail, all being arranged substantially as shown and described.

In testimony whereof I affix my signature, in presence of two witnesses.

GEORGE J. GOUKER.

Witnesses:
C. B. McDougal,
L. M. Thurlow.